United States Patent [19]

Ueno et al.

[11] 4,101,534

[45] Jul. 18, 1978

[54] METAL-BONDING ADHESIVE COMPOSITIONS

[75] Inventors: Hiroshi Ueno, Kawasaki; Shinya Otsuka, Tokyo; Tetsuo Tsukamoto, Tokyo; Akira Kishimoto, Tokyo, all of Japan

[73] Assignee: Toyo Seikan Kaisha Limited, Japan

[21] Appl. No.: 271,409

[22] Filed: Jul. 13, 1972

[30] Foreign Application Priority Data

Aug. 4, 1971 [JP] Japan .................................. 46-58362

[51] Int. Cl.² .............................................. C08L 77/00
[52] U.S. Cl. ............................. 260/857 TW; 156/331; 428/424
[58] Field of Search ................................. 260/857 TW

[56] References Cited

U.S. PATENT DOCUMENTS

| | | | |
|---|---|---|---|
| 2,193,529 | 3/1940 | Coffman | 260/857 TW |
| 2,824,848 | 2/1958 | Wittcoff | 260/857 TW |
| 3,097,181 | 7/1963 | Glickman | 260/857 TW |
| 3,406,053 | 10/1968 | Jaenicke | 260/857 TW |
| 3,536,780 | 10/1970 | Schaaf | 260/857 TW |

FOREIGN PATENT DOCUMENTS

1,256,662 12/1971 United Kingdom ......... 260/857 TW

*Primary Examiner*—Paul Lieberman

[57] ABSTRACT

A metal-bonding adhesive composition consisting essentially of 95 – 60% by weight, based on the total composition, of an aliphatic homopolyamide and 5 – 40% by weight, based on the total composition, of an aliphatic copolyamide, said homopolyamide being a crystalline homopolyamide having up to 14 amide groups per 100 carbon atoms, and said copolyamide consisting of 90 – 70% by weight of (1) a polyamide having up to 14 amide groups per 100 carbon atoms and 10 – 30% by weight of (2) at least one polyamide whose recurring units are different from those of said polyamide (1), and a metallic can body composed of a metal blank, both side end portions of which are bonded by the side-lap-seam interposed by a layer of said adhesive composition.

16 Claims, 2 Drawing Figures

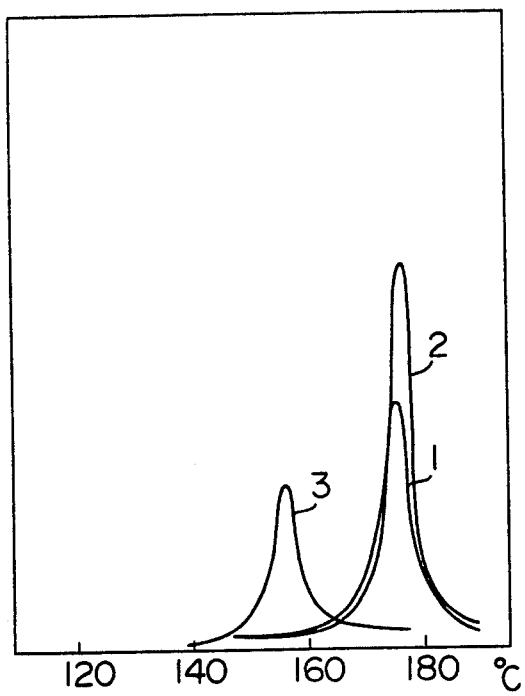
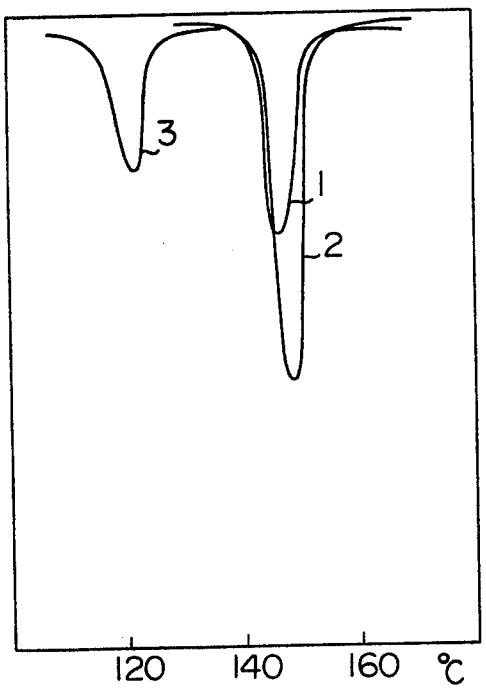

METAL-BONDING ADHESIVE COMPOSITIONS

This invention relates to a metal adhesive consisting essentially of a peculiar homopolyamide-copolyamide composition, which is especially valuable for obtaining metal-to-metal bondings in the manufacture of metal cans and containers.

It has been known that polyamides are in general excellent as hot melt adhesives for bonding metals. It has also been well known that polyamides exhibit a high adhesive property to metals because of amide functional groups contained in the molecule chain and that in polyamides the degree of dependency of the melt viscosity on temperatures is greater than in other thermoplastic resins, for instance, polyethylene, and therefore, they are particularly suitable for the melt adhesion.

In the can manufacturing industry, so-called tin-free steels such as chromium-plated steels and steels electrolytically treated with chromic acid have been used broadly as can blanks instead of tin-plated steels. As the method of side-seaming such new can blanks there has been developed a so-called side-lap-seam method where both side ends of the can blank are bonded to each other with an organic adhesive. Nylon-11, nylon-12 and copolyamides thereof have been used broadly as nylon type adhesives for such side-lap-seam method. Nylon-11, nylon-12 and copolyamides thereof have a relatively lower melting point than other nylons and possess such merits as low water absorption and high impact strength. However, they are still insufficient in respect to high speed bonding, bonding strength and processability of bonded can bodies. For instance, in the most advanced high speed canning process conducted on a commercial scale, the operation must be conducted at such a high rate as 300 – 1000 cans per minute, and for attainment of such high speed operation, the step of bonding the side-seam portions, i.e., the cycle of melt adhesion and cooling of the adhesive, must be completed within such a short period as 20 – 200 milliseconds. Further, after packing of goods or contents the so prepared can bodies must be subjected to the double-seaming operation at a temperature, for example, ranging from −2° C. to +5° C. in the case of cans for beer and soft drinks. This double-seaming operation is accomplished at such a high rate as, for example, 1600 cans or more per minute.

As descrived above, it is essential for side-seam adhesives to be able to attain a sufficient bonding for a very short period of time during which one cycle of melt adhesion and cooling is accomplished. At the same time, they can stand rapid deformation (processing) conducted at a relatively low temperature. Conventional adhesives of the polyamide type (nylon type) do not completely meet such requirements.

An object of this invention is to provide a metal adhesive which can give a metal-to-metal bonding of a sufficient bonding strength by a very short cycle of melt adhesion and cooling, whereby there is obtained a bonded metal article in which the bonded portion can stand a rapid processing conducted at a low temperature sufficiently.

Another object of this invention is to provide a hot melt adhesive for use in bonding side-seam portions of cans in the can manufacture.

Other objects and advantages of this invention will be apparent from the description given hereinbelow.

We have found that the following polymer composition is an excellent metal adhesive suitable for attaining the objects of this invention, that is, the objects of this invention can be attained by a peculiar polymer composition which is a blend composition consisting essentially of (a) 95 – 60% by weight, based on the total composition, of an aliphatic homopolyamide and (b) 5 – 40% by weight, based on the total composition, of an aliphatic copolyamide, said homopolyamide (a) being a crystalline homopolyamide having up to 14 amido groups per 100 carbon atoms, and said copolyamide (b) consisting of (i) 95 – 60% by weight of a polyamide having up to 14 amide groups per 100 carbon atoms and (ii) 5 – 40% by weight of at least one polyamide whose recurring units are different from those of said polyamide (i).

This invention will now be described detailedly.

In the adhesive of this invention it is essential that the component (a) should be a crystalline homopolyamide and it should have up to 14 amide groups per 100 carbon atoms.

It has been known that a polyamide obtained by polycondensing, for instance, a dimerized fatty acid with an aliphatic diamine can be used as a metal adhesive for use in the can manufacture (see the specification of British Pat. No. 1,189,846). However, the above polyamide adhesive is substantially amorphous, and therefore, it is defective in that can bodies lap-adhered with such adhesive exhibit a low bonding strength at the bonded portion. In contrast, in the adhesive of this invention, since a crystalline homopolyamide is used as the main component, namely the first component (a), such defect is not observed.

In order for the adhesive to have a melting temperature maintained within a relatively low range and have a water content maintained at a low level, it is essential that the crystalline homopolyamide (a) should have up to 14 amide groups, preferably 13 to 7 amide groups, per 100 carbon atoms. In the case of a polyamide having more than 14 amide groups per 100 carbon atoms, such as nylon 6 and nylon 66, a high metal-bonding strength can be obtained, but such polyamide cannot be free from such defects as high melting point and high water content. In the can manufacturing industry, it is generally conducted to apply a coating of an organic polymer on surfaces of can blanks for purposes of protective printing and adhesion. In case the adhesive to be used has a high melting point, such coating is damaged at the high temperature bonding treatment, which gives undesired results. Further, in the case of the adhesive having a high melting point, since the adhesive layer applied to a can blank should be heated at a high temperature, other portions of a can body should naturally be heated at such high temperature concurrently, with the consequence that quenching of the adhesive layer portion becomes difficult. Accordingly, the use of a polyamide having a high melting point is not suitable for a high rate can-making operation. In the case of a polyamide having a high water content, at the time of lap-bonding of can bodies, bubbles of water vapor are formed in the molten polyamide adhesive layer and these bubbles are left in the form of voids in the lap-bonded portion, which are eluted into the contents or cause leakage thereof. In case a crystalline polyamide to be used has a high water absorption, the adhesive absorbs water and a change in the volume of the adhesive is caused to occur, with the result that the bonding ability of the adhesive is lowered with the lapse of time. Also the concentration of the amide group in the crystalline polyamide is an important factor determining the softness, and a low plified as the homopolyamide composed of the recurring units expressed by general formula (II).

|  | Kind of Crystalline Homopolyamide | Melting Point (° C.) | Saturation Water Absorption at 20° C. (%) |
|---|---|---|---|
| Nylon 6-10 | Polyhexamethylene sebacamide | 225 | 3.5 |
| Nylon 6-12 | Polyhexamethylene dodecamide | 212 | — |
| Nylon 6-13 | Polyhexamethylene tridecamide | 204 | — |
| Nylon 10-6 | Polydecamethylene adipamide | 225 | — |
| Nylon 10-10 | Polydecamethylene sebacamide | 213 | — |
| Nylon 10-12 | Polydecamethylene dodecamide | 195 | — |
| Nylon 10-13 | Polydecamethylene tridecamide | 187 | — |
| Nylon 12-6 | Polydodecamethylene adipamide | 210 | — |
| Nylon 12-10 | Polydodecamethylene sebacamide | 190 | — |
| Nylon 12-12 | Polydodecamethylene dodecamide | 185 | — |
| Nylon 12-13 | Polydodecamethylene tridecamide | — | — |
| Nylon 13-6 | Polytridecamethylene adipamide | — | — |
| Nylon 13-10 | Polytridecamethylene sebacamide | 170 | — |
| Nylon 13-12 | Polytridecamethylene dodecamide | — | — |
| Nylon 13-13 | Polytridecamethylene tridecamide | 174 | 0.75 |
| Nylon 10-9 | Polydecamdethylene azelamide | — | — |
| Nylon 12-9 | Polydodecamethylene azelamide | — | — |
| Nylon 13-9 | Polytridecamethylene azelamide | — | — | concentration gives a high softness to the polymer. A homopolyamide having up to 14 amide groups, preferably 13 - 7 amide groups, per 100 carbon atoms, which is used as the component (a) in the adhesive of this invention, possesses a desirable combination of a relatively low melting point and a low water content.

As such homopolyamide there may be mentioned polymers of an ω-amino acid or ω-lactam having at least 8 carbon atoms. In general, polyamides of this type consist of the recurring units expressed by the following formula:

$$\mathrm{+CORNH+} \qquad (I)$$

wherein R stands for an aliphatic hydrocarbon radical having at least 7 carbon atoms, preferably a linear alkylene radical having at least 7 carbon atoms.

The following may be cited as specific examples of such homopolyamide.

|  | Kind of Crystalline Homopolyamide | Melting Point (° C.) | Saturation Water Absorption at 20° C. (%) |
|---|---|---|---|
| Nylon 8 | polymer of ω-amino caprylic acid | 200 | 3.8 |
| Nylon 9 | polymer of ω-amino pelargonic acid | 210 | 3.0 |
| Nylon 10 | polymer of ω-amino decanoic acid | 188 | 2.0 |
| Nylon 11 | polymer of ω-amino undecanoic acid | 187 | 1.8 |
| Nylon 12 | polymer of ω-amino dodecanoic acid | 178 | 1.4 |
| Nylon 13 | polymer of ω-amino tridecanoic acid | 170 | 1.04 |

In this invention, in addition to homopolyamides consisting of the recurring units expressed by above general formula (I), there may be employed polycondensates of a diamine with a dicarboxylic acid or its functional derivative, in which the total number of the carbon atoms of the diamine and the dicarboxylic acid is at least 16. Polyamides of this type consist essentially of the recurring units expressed by the following formula:

$$\mathrm{+COR^1CONH-R^2NH+} \qquad (II)$$

wherein $R^1$ and $R^2$ each stand for an aliphatic hydrocarbon radical and the total number of the carbon atoms of $R^1$ and $R^2$ is at least 14.

In above formula (II), $R^1$ stands preferably for a linear alkylene radical having at least 4 carbon atom and $R^2$ stands preferably for a linear alkylene radical having at least 6 carbon atoms, and they are selected so that, as described above, the total number of the carbon atoms of $R^1$ and $R^2$ is at least 14. The following may be exemplified as the homopolyamide composed of the recurring units expressed by general formula (II).

Of course, the crystalline homopolyamide (a) to be used in this invention may comprise, in addition to the abovementioned recurring units, small quantity of other amide recurring units, as far as they do not damage the properties of the crystalline homopolyamide.

It is important that the crystalline homopolyamide (a) to be used in this invention has a relative viscosity (η rel.) of 1.8 to 3.5 measured in a solution of 1 g polymer in 100 cc of 98% sulfuric acid at 20° C. A homopolyamide having a relative viscosity lower than the above range is poor in mechanical properties and fails to give a sufficient bonding strength to the lap-seamed portion of the can. In the case of a homopolyamide having a relative viscosity higher than the above range specified in this invention, the melt viscosity of the adhesive is too high at the time of melt adhesion, and a temperature much higher than the melting point is required for adhesion. For such reason use of a polyamide having too high a relative viscosity is not preferred.

In this invention, when the relative viscosity of the homopolyamide (a) is within the above range, sufficient results can be obtained. However, much better results can be obtained when the relative viscosity is within a range of from 2.2 to 2.8.

In accordance with this invention, a copolyamide (b) consisting of 95 - 60% by weight, preferably 90 - 70% weight, of the amide recurring units of the above homopolyamide (a) and 5 - 40% by weight, preferably 10 - 30% by weight, of the amide recurring units of at least one polyamide other than the above homopolyamide (a), is used in combination with the above crystalline homopolyamide (a).

As the monomer constituting the crystalline homopolyamide (i) occupying 95 - 60% by weight of the amide recurring units of the copolyamide (b), there may be mentioned known monomers such as those used for formation of polyamides of the recurring units expressed by above formula (I) or (II). Specific examples of such monomers are (1) ω-lactams expressed by the following formula:

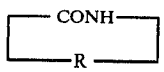 (III-1)

wherein R is as defined above, (2) ω-amino acids expressed by the following formula:

H₂N—R—COOH (III-2)

wherein R is as defined above, and (3) a combination of a dicarboxylic acid expressed by the following formula:

HOOC—R¹—COOH (III-3-a)

wherein R¹ is as defined above, or its functional derivative (such as an acid halide) with a diamine expressed by the following formula:

H₂N—R²—NH₂ (III-3-b)

wherein R² is as defined above.

As the monomer constituting the polyamide (ii) other than the polyamide (i) of the above monomer, which occupies 5 - 40% by weight of the recurring units of the copolyamide (b), there may be employed monomers of above formulae (III-1),(III-2),(III-3-b) and (III-3-b) with the proviso that they should differ from the monomer of the polyamide (i) with respect to R, R¹ or R². For instance, in case the crystalline homopolyamide (a) is a polymer of ω-amino dodecanoic acid (polylauryl lactam), as the copolyamide (b) there may be employed a copolyamide composed of lauryl lactam and at least one member selected from ε-caprolactam, ω-enantholactam, ω-amino undecanoic acid, ω-amino tridecanoic acid, hexamethylene diammonium adipate, hexamethylene diammonium sebacate, hexamethylene diammonium dodecanoate, hexamethylene diammonium tridecanoate and dodecamethylene diammonium adipate, etc. In case the crystalline homopolyamide (a) is polydodecamethylene adipamide, there may be employed a copolyamide composed of dodecamethylene diammonium adipate and at least one member selected from ε-caprolactam, ω-enantholactam, ω-lauryl lactam, ω-amino undecanoic acid, ω-amino tridecanoic acid, hexamethylene diammonium sebacate and hexamethylene diammonium dodecanoate, etc.

For better illustration, the copolyamide (b) will be described by reference to the recurring units:

Namely, the copolyamide (b) used in this invention includes (1) a copolyamide consisting of (i) 95 - 60% by weight of the recurring units expressed by the formula:

-(-CO—R-)-NH— (I)

wherein R stands for an aliphatic hydrocarbon radical having at least 7 carbon atoms,
and (ii) 5 - 40% by weight of the recurring units expressed by at least one of the following formulae:

-(-CO—R³—NH-)- (IV)

and

-(-COR⁴—CONH—R⁵—NH-)- (V)

wherein R³ stands for an aliphatic hydrocarbon radical having at least 5 carbon atoms, which is different from R, and R⁴ and R⁵ each stand for an aliphatic hydrocarbon radical, it being preferred that R⁴ is a linear alkylene radical having at least 4 carbon atoms and R⁵ is a linear alkylene radical having at least 6 carbon atoms, and (2) a copolyamide consisting of (i) 95 - 60% by weight of the recurring units expressed by the following formula:

-(-COR¹CONH—R²NH-)- (II)

wherein R¹ and R² each stand for an aliphatic hydrocarbon radical and the total number of the carbon atoms of R¹ and R² is at least 14, it being preferred that R¹ is a linear alkylene radical having at least 4 carbon atoms and R² is a linear alkylene radical having at least 6 carbon atoms, and (ii) 5 - 40% by weight of the recurring units expressed by at least one of the following formulae:

-(-COR⁶CONHR⁷NH-)- (VI)

and

-(-COR⁸NH-)- (VII)

wherein R⁶ and R⁷ each stand for an aliphatic hydrocarbon radical, it being preferred that R⁶ is a linear alkylene radical having at least 4 carbon atoms and R⁷ is a linear alkylene radical having at least 6 carbon atoms, with the proviso that at least one of R⁶ and R⁷ is different from either of R¹ and R², and R⁸ stands for an aliphatic hydrocarbon radical having at least 5 carbon atoms.

The above-mentioned copolyamide (b) may be either a random copolyamide or a block copolyamide.

Specific examples of such copolyamide are as follows:

* ω-amino dodecanoic acid/ω-amino caproic acid copolyamide,
* ω-amino dodecanoic acid/hexamethylene diammonium adipate copolyamide,
* ω-amino dodecanoic acid/hexamethylene diammonium sebacate copolyamide,
* ω-amino undecanoic acid/ω-amino caproic acid copolyamide,
* ω-amino undecanoic acid/hexamethylene diammonium adipate copolyamide,
* ω-amino undecanoic acid/hexamethylene diammonium sebacate copolyamide,
* hexamethylene diammonium sebacate/ω-amino caproic acid copolyamide,
* hexamethylene diammonium sebacate/hexamethylene diammonium decanoate copolyamide,
* dodecamethylene diammonium adipate/ω-amino caproic acid copolyamide,
* dodecamethylene diammonium adipate/ω-amino undecanoic acid copolyamide, etc.

In this invention, it is preferred that a polyamide component having the same kind of recurring units as those of the polyamide component of the crystalline homopolyamide (a) is employed as the polyamide component (i) of the copolyamide (b). For instance, it is desired that in case the crystalline homopolyamide (a) is composed of the recurring units of above formula (I), namely —CORNH— in which R is as defined above, also the polyamide component (i) of the copolyamide (b) is composed of the recurring units of formula (I). Likewise, it is desired that in case the crystalline homopolyamide (a) is composed of the recurring units of the above formula (II), namely —COR$^1$CONH—R$^2$—NH— in which R$^1$ and R$^2$ are as defined above, aslo the polyamide component (i) of the copolyamide (b) is composed of the recurring units of formula (II).

In this invention it is also important that the above-mentioned copolyamide should comprise 95 – 60% by weight, preferably 90 – 70% by weight, of the amide recurring units of a polyamide (a) having up to 14 amide groups per 100 carbon atoms. Copolyamides comprising the amide recurring units of the polyamide component (a) in an amount of less than 60% by weight or the recurring amide units of the crystalline polyamide component (i) in an amount of greater than 95% by weight are inferior to copolyamides having a composition within the range specified in this invention in the point that when they are combined with the crystalline homopolyamide (a) to form adhesives and used for bonding metals at high rates, the bonding strength (peel strength) is extremely low and processability of the bonded portion is extremely poor. For instance, when can bodies lap-seamed with a layer of an adhesive composed of a crystalline homopolyamide (a) and a copolyamide having a composition outside the range specified in this invention is subjected to the double seaming, leakages are caused to occur at a certain frequency.

It has been proposed to employ a combination of a crystalline polyamide with a polymer different from the said crystalline polyamide as a metal adhesive. For instance, the German laid-open specification No. 2,010,497 discloses that a composition obtained by blending a crystalline polyamide such as nylon 6 or nylon 12 with an amorphous or semicrystalline polyamide at a mixing ratio of from 99 : 1 to 90 : 10 on the weight baisis may be used as a metal adhesive and that various copolyamides may be used as such semicrystalline polyamide. However, the said laid-open specification has no recognition of the criticality of selection of a homopolyamide having up to 14 amide groups per 100 carbon atoms as such crystalline homopolyamide or of selection of a copolyamide comprising 95 – 60% by weight of the polyamide component having up to 14 amide groups per 100 carbon atoms as a component to be combined with said crystalline homopolyamide.

From results of comparative tests illustrated in Example 6 given below, it will readily be understood how important the selection and combination of the crystalline homopolyamide and copolyamide components is for attaining high bonding strength and excellent low temperature processability in the bonded portions.

In an especially preferable embodiment of this invention, 95 – 60% by weight of the total amide recurring units of the copolyamide (b) are constructed of the same amide recurring units as those of the crystalline homopolyamide (a) and the remaining amide recurring units are constructed of other amide recurring units. The adhesive composition of this embodiment can give a desirable combination of an excellent bonding strength at a high speed bonding operation and an excellent high speed processability of the sealed portion.

For instance, it is important that in case polylauryl lactam is used as the crystalline homopolyamide (a), 95 – 60% by weight of the total recurring units of the copolyamide (b) should be composed of the units of ω-amino dodecanoic acid.

The degree of polymerication of the copolyamide (b) is not particularly critical in this invention, but in general, it is preferred that the copolyamide (b) has a relative viscosity of from 1.8 to 3.5 measured in a solution of 1 g polymer in 100 cc of 98% sulfuric acid at 20° C.

In order to improve the high speed processability of the bonded portion and the bonding ability of the adhesive as well as to make the high speed bonding operation possible, it is important that the above-mentioned crystalline homopolyamide (a) and copolyamide (b) are blended at a weight percentile ratio of (a) : (b) = 95 – 60 : 5 – 40, preferably (a) : (b) = 89 – 70 : 11 – 30.

For example, at a copolyamide (b) content not exceeding 5% by weight, the heat necessary for melting the adhesive (namely, the heat necessary for solidifying the melt) is great and a high operability of the metal-to-metal bonding cannot be attained. At a copolyamide (b) content exceeding 40% by weight, the bonding ability of the adhesive is lowered. Accordingly, in each case, improvement of the bonding strength cannot be obtained. Still further, in adhesives in which the mixing ratio of the crystalline homopolyamide (a) and copolyamide (b) is outside the range specified in this invention, the processability of portions bonded or seamed by such adhesives is poor. For instance, when can bodies lap-seamed by such adhesives are subjected to the flanging operation, peeling or exfoliation of the bonded layer is caused to occur, or when such can bodies are double-seamed with can lids, leakages tend to be caused by the peeling of the bonded layer.

As a polyamide composition most similar to the metal adhesive of this invention, there may be mentioned a polyamide composition excellent in transparency disclosed in the specification of Swiss Pat. No. 413,356. This composition consists of (A) 50 – 95% by weight of a homopolyamide and (B) 5 – 50% by weight of copolyamide which is composed of 10 – 60% by weight of a polyamide component same as said homopolyamide (A) and 90 – 40% by weight of other polyamide component. However, this specification does not give any description concerning the use of this composition as an adhesive for bonding metals, nor has any recognition that it would be very important in the use of such composition as a metal adhesive that either the polyamide component of a crystalline homopolyamide or one component of the copolyamide should be a polyamide component having up to 14 amide groups per 100 carbon atoms. Still further, a preferable mixing ratio of the polyamide components (i) and (ii) in the copolyamide (b) of this invention is quite different from the mixing ratio in such known composition. From the results shown in Table II in Example 2 given hereinbelow, it will readily be understood that this ratio of the two polyamide components (i) and (ii) in the copolyamide (b) is very important for attaining the desired peel strength and low temperature processability of the bonded portions.

The adhesive of this invention may be applied to adhesion of metals in an optional form. For instance, it is possible to employ the adhesive in the form of a molded article obtained by melt mixing the crystalline homopolyamide (a) and copolyamide (b) by a method known per se and molding the melt into a film, a tape, a powder or the like. In this case, the adhesive in the form of a film, tape or powder is applied to portions of metals to be bonded, and the metals interposed by the layer of the adhesive in the molten state are pressed and the adhesive layer is then solidified. Thus, a metal-to-metal bonding is obtained. In case the adhesive of a powdery form is used, it is applied on metals by the fluidizing bed coating method or powder flame spraying method, and bonding of metals is accomplished by the above-mentioned procedures. It is also possible to obtain a metal-to-metal bonding by extruding the melt of the adhesive of this invention to portions of metals to be bonded and conducting the above-mentioned bonding procedures.

When the crystalline homoolyamide (a) and copolyamide (b) are molten and mixed, as described hereinbelow, it sometimes happens that the inter-reaction is caused to occur between them, but any bad influence is not given to the effects of the composition of this invention as adhesive. In some cases, occurrence of such inter-reaction brings about such advantage that the cycle of melt adhesion and cooling can be shortened and a metal-to-metal bonding of a high bonding strength can be obtained.

The adhesive of this invention is very useful and effective for bonding various metals. As such metal there may be exemplified steel plates, aluminum plates, steel plates coated with zinc, tin, chromium or aluminum, and steel plates whose surfaces are chemically or electrolytically treated with chromic acid, phosphoric acid or the like. As is well known in the art, it is preferred that blanks of these metals have a primer coating on the surface thereof in order to protect the metal surface, improve the printability of the outer surface and facilitate bonding of metals. As such primer there may be used known primers such as epoxy-phenol resins.

The adhesive of this invention is especially valuable as a side-lap-seam adhesive for making metallic cans from the above-mentioned metal blanks, especially those of tin-free steels having a primer coating.

In the adhesive of this invention, the heat required for melting, namely the heat required for cooling and solidifying the melt, is very small as compared with conventional adhesives of nylon 11 or nylon 12. Accordingly, the lap-seaming of the end portions of a can blank can be accomplished by a shorter cycle of melt adhesion and cooling. Further, the adhesive of this invention exhibits usually a low melting point and hence, the coating of a metal blank is not damaged at the melt adhesion operation. Still further, since the adhesive of this invention has a low water content, bubbling of the adhesive layer is not caused to occur at the melt adhesion operation, with the result that such undesired phenomena as lowering of the bonding strength and the leakage of the contents are not brought about at all. Moreover, when can bodies which have been side-lap-seamed with the adhesive of this invention, are subjected to the flanging processing or double-saaming operation, the side-lap-seamed portions do not sustain such damages as exfoliation of the adhesive layer. Accordingly, occurrence of leakages can be effectively prevented even if the can making operation of the seaming operation is conducted at a high rate at a relatively low temperature.

Excellent effects attained by the adhesive of this invention will now be detailed by reference to Examples.

In Examples, the melting point is expressed in terms of the temperature at which the endothermic peak determined by a differential scanning calorimeter appears.

The crystallization temperature is expressed in terms of the temperature at which the exothermic peak determined by a differential scanning calorimeter appears.

The value of the melt viscosity is that of an apparent viscosity at 220° C. determined by a flow tester of the extrusion type while adjusting the shear rate to 100/sec.

The heat of fusion of the crystalline homopolyamide is determined by a differential scanning calorimeter, and the value of the heat of fusion of the adhesive of the crystalline homopolyamide and copolyamide is expressed by a relative value calculated while regarding the measured value of the crystalline polyamide as 100.

The value of water absorption is that of the amount (%) of water absorbed at saturation.

The peel strength is the value obtained by measuring the strength of the lap-seamed portion cut from the can body and calculating it to the value expressed in the Kg/cm unit.

The leakage test is conducted by double-seaming upper and lower can ends to the can body, introducing air into the seamed can at a pressure of 6 Kg/cm$^2$ and counting the number of air leakages.

In Examples, samples indicated by a mark "*" are those of adhesives of this invention, and samples with no mark are those of comparative adhesives outside the scope of this invention.

Examples 1 – 6 illustrate embodiments where adhesives of this invention are used for side-lap-seaming of end portions of can bodies.

Examples 1 – 3 show the relation between properties of the adhesive and the weight ratio of the recurring units of the polyamide component (i) and the recurring units of other polyamide (ii) in the copolyamide (b) of the adhesive composition. Namely, the ratio of the polyamide components (i) and (ii) is varied, and the influences of said ratio on the properties of the adhesive are examined. In these Examples, the ratio of the polyamide (a) and copolyamide (b) is kept constant.

In accompanying drawings, FIG. 1 is a graph illustrating the relation between the temperature and the endothermic value at the time of melting the adhesive with respect to adhesive 1 of this invention and comparative adhesives 2 and 3.

FIG. 2 is a graph illustrating the relation between the temperature and the exothermic value at the time of cooling and solidifying the melt of the adhesive with respect to adhesive 1 of this invention and comparative adhesives 2 and 3.

EXAMPLE 1

80 Parts by weight of granular solids of polylauryl lactam (have a relative viscosity of 2.48 measured in a solution of 1g of the polymer in 100cc of 98% concentrated sulfuric acid) which is a crystalline homopolyamide are mixed with 20 parts by weight of granular solids of a copolyamide consisting of the amide recurring units of polylauryl lactam and the amide recurring units of polycaprolactam at a weight ratio ranging from 100/0 to 30/70 and having relative viscosity $\eta r$ of 2.45 ± 0.05, and the blend is molded into a film of a thickness of 50$\mu$ by means of a film-forming apparatus comprising an extruder equipped with a nylon type screw having a diameter of 25 mm and an effective length of 600 mm, and T die attached to the extruder, which has an extrusion width of 0.3 mm and a length of 100 mm. The heat extrusion is conducted at 200° C. while maintaining the screw rotation rate at 40 rpm. Both surfaces of a large plate of steel electrolytically treated with chromic acid having a thickness of 0.17 mm, a length of 780 mm and a width of 844 mm are coated with an epoxy-phenolic resin in a thickness of 5 $\mu$, and the dry curing is effected for 10 minutes at 210° C. The resulting large plate is cut into strips having a length of 780 mm and a width of 210 mm.

Both side end portions of a width of about 7 - 8 mm along the longitudinal direction of the strip is heated at about 240° C. by high frequency induction heating, and tapes of a 5 mm width of the above film having a thickness of 50 μ are pressed on both side end portions of the strip for a period of 47 milliseconds by means of a press roll.

The so adhesive-applied strip is further cut into can blanks of 125 mm × 210 mm.

From these blanks, cylindrical can bodies of a 125 mm height are formed by an ordinary can making apparatus, and both side end portions to which the adhesive has been applied are heated at 240° C. by high frequency induction heating and the cooling press is conducted for 43 milliseconds so that the adhesive layers are piled together. Thus, can bodies are prepared. The width of the seamed overlap of the can body is 5 mm.

The so prepared can bodies are subjected to the ordinary flanging operation, and they are double-seamed with upper and lower can ends at a rate of 550 cans per minute by means of an ordinary double-seaming machine.

Properties of adhesives prepared by the above-mentioned method, and results of the peel strength and leakage tests of the so prepared can bodies are shown in Table I.

ratio is within a range of from 90 : 10 to 70 : 30 (samples 4 to 6), the bonding strength is at a maximum level.

When the proportion of the amide recurring units of polylauryl lactam in the copolyamide (b) is greater than 95% by weight or smaller than 60% by weight, the bonding strength is much reduced and leakages are frequently observed after the seaming operation.

It is also seen that although the water absorption tends to increase as the amide recurring unit weight ratio decreases, within the range specified in this invention, namely within the amide recurring unit weight ratio range of from 95 : 5 to 60 : 40, the water absorption of the adhesive is not greatly different from that of polylauryl lactam. Further, the melting point, crystallization temperature and melt viscosity of the adhesive composition are not greatly different from those of polylauryl lactam when the amide recurring unit weight ratio is maintained within the range specified in this invention.

Explanation will now be given by reference to sample 5 of Example 1 and FIGS. 1 and 2 on the melting and crystallizing behaviors of the adhesive so as to clarify that the adhesive of this invention is excellent especially in the high speed bonding ability.

FIG. 1 illustrate the melting behavior of the adhesive observed when a prescribed amount of the adhesive is heated at a certain temperature-raising rate, with respect to the adhesive of this invention and comparative adhesives of polylauryl lactam and of a copolyamide Table I Relation Between Weight Ratio of Amide Recurring Units of Polylauryl Lactam and Amide Recurring Units of Polycaprolactam in Copolyamide and Properties of Adhesive (Weight Ratio of Crystalline Homopolyamide/Copolyamide = 80/20)

| Sample No. | Weight Ratio of polylauryl lactam amide recurring units/polycaprolactam amide recurring units in copolyamide | Heat of fusion | Peel strength (kg/cm) | Number of leakages from double-seamed portions per 240 samples | Water absorption % | Melting point (° C.) | Crystallization temperature (° C.) | Melt Viscosity at 220° C. (poise) | Melting Point of copolyamide (° C.) | Water absorption of copolyamide (%) |
|---|---|---|---|---|---|---|---|---|---|---|
| 1 | 100/0 | 100 | 7.5 | 6 | 1.4 | 178 | 148 | 13000 | — | — |
| 2 | 97/3 | 98 | 7.9 | 5 | 1.4 | 178 | 148 | 13000 | 176 | 1.5 |
| 3* | 95/5 | 89 | 11.0 | 0 | 1.4 | 178 | 148 | 12600 | 174 | 1.8 |
| 4* | 90/10 | 82 | 15.5 | 0 | 1.5 | 178 | 147 | 12000 | 169 | 2.0 |
| 5* | 80/20 | 75 | 16.5 | 0 | 1.5 | 177 | 146 | 12400 | 157 | 2.6 |
| 6* | 70/30 | 73 | 15.0 | 0 | 1.6 | 177 | 146 | 11200 | 149 | 3.3 |
| 7* | 60/40 | 70 | 14.2 | 0 | 1.7 | 175 | 144 | 11300 | 141 | 4.0 |
| 8 | 50/50 | 68 | 7.1 | 5 | 2.1 | 173 | 144 | 10800 | 148 | 5.5 |
| 9 | 30/70 | 85 | 3.1 | 105 | 2.6 | 178 | 146 | 10500 | 179 | 7.2 |

By reference to test results shown in Table I, it will now be explained that the adhesive of this invention is very excellent and that the limitation of the composition of the copolyamide (b) is of great significance.

From the results shown in Table I, it will readily be understood that when the mixing ratio of polylauryl lactam and copolyamide (b) is kept constant at 80 : 20, as the weight ratio of the amide recurring units of polylauryl lactam to the amide recurring units of polycaprolactam in the copolyamide (b) decreases, the heat of fusion tends to decrease, and the bonding strength is high when the above-mentioned weight ratio of the recurring units of polylauryl amide to the recurring units of polycaprolactam (which will be referred to as "the amide recurring weight ratio" hereinbelow) is within a range of from 95 : 5 to 60 : 40 (sample 3 to 7), namely within the range specified in this invention, and no leakage from the bonded portion after the seaming operation is observed at all in samples obtained when the amide recurring unit weitht ratio is within the above range. Especially when the amide recurring unit weight composed of 80% by weight of the polylauryl lactam recurring units and 20% by weight of the polycaprolactam recurring units. The endothermic amount per unit time by melting is plotted on the ordinate and the temperature is indicated on the abscissa.

Curve 1 illustrates the Thermal behavior of the adhesive of this invention, Curve 2 illustrates that of polylauryl lactam and Curve 3 illustrates the Thermal behavior of the copolyamide used for preparation of sample 5, which is composed of lauryl lactam and ε-caprolactam.

As is seen from FIG. 1, in each of the adhesive of this invention and other two comparative polyamides, the endothermic peak owing to the melting of crystals, which is determined by the crystalline polyamide, is observed.

The temperature at which the heat of fusion is at its peak, i.e., the melting point, does not differ greatly in the adhesive of this invention and polylauryl lactam, but the peak area is smaller in the adhesive of this invention than in polylauryl lactam. This means that the adhesive of this invention has a lower degree of crystallization than the homopolyamide free of the copolyamide, i.e., polylauryl lactam, and that the heat necessary for melting crystals is smaller in the adhesive of this invention than in the homopolyamide. From this it is seen that the adhesive of this invention is advantageous over polylauryl lactam in the high speed melt adhesion.

In the adhesive of this invention, the peak owing to melting of the copolyamide component does not appear. Although the reason has not been completely elucidated, it is construed that when the homopolyamide and copolyamide are blended in the molten state, an inter-reaction, for instance, an amide-exchange reaction, is caused to occur between the homopolyamide and copolyamide, with the result that the crystallization of the copolyamide during the cooling step is inhibited.

FIG. 2 illustrates the behavior of crystallization observed when the adhesive of this invention, polylauryl lactam and a copolyamide comprising 80% by weight of the polylauryl lactam recurring units and 20% by weight of polycaprolactam are cooled from the molten state.

Curve 1 shows the crystallization behavior of the adhesive of this invention, and Curves 2 and 3 illustrate the crystallization behaviors of polylauryl lactam and the copolyamide composed of lauryl lactam and $\epsilon$-caprolactam, respectively.

As is seen from FIG. 2, in each of the adhesive of this invention, polylauryl lactam and the copolyamide, the exothermic peak owing to crystallization is found at the crystallization temperature characteristic of each polymer.

There is not a great difference between the adhesive of this invention and polylauryl lactam with respect to the temperature at which the heat generation owing to crystallization is at its peak, namely the crystallization temperature, but the peak area is smaller in the adhesive of this invention than in polylauryl lactam.

The above fact means that in the adhesive of this invention the crystallization necessary for giving a sufficient toughness to the adhesive after the melt adhesion is attained by a small quantity of heat generation, and the solidification by cooling can be accomplished by a small quantity of the heat balance. Therefore, the solidification by cooling after the high speed melt adhesion can be performed advantageously in the adhesive of this invention.

In contrast, in the case of the copolyamide of lauryl lactam and $\epsilon$-caprolactam, the crystallization temperature is too low, and hence, it is difficult to lower the temperature below the crystallization temperature during the high speed cooling step.

As is seen from the foregoing, the heat necessary for melting and solidifying the adhesive is very small in the case of the adhesive of this invention, and at a certain temperature the crystallization is rapidly promoted to give high physical properties such as strength and toughness to the solidified adhesive.

For such characteristics of the adhesive of this invention, when the adhesive of this invention is employed, each of the heating and cooling steps can be completed for such a short time as 20 – 200 milliseconds, and a tough seam can be made.

As compared with polylauryl lactam which is a crystalline homopolyamide, the adhesive of this invention can possess excellent impact resistance and processability by dint of a copolymer nylon of a specific structure incorporated therein. Accordingly, the adhesive of this invention can stand sufficiently the steps of the flange processing and high speed double-seaming after the can-making step, and with use of the adhesive of this invention, it is possible to produce flawless canned goods at a very high rate.

EXAMPLE 2

75 Parts by weight of granular solids of a polymer of $\omega$-amino undecanoic acid (nylon 11; relative viscosity = 2.45), which is a crystalline homopolyamide, are mixed with 25 parts by weight of granular solids of a copolyamide consisting of the amide recurring units of the polymer of $\omega$-amino undecanoic acid and the polycaprolactam recurring units at a weight ratio ranging from 100/0 to 30/70 having a relative viscosity $\eta r$ of 2.45 ± 0.05, and the blend is formed into a film of a thickness of 50$\mu$ by employing the same film-molding apparatus as used in Example 1. The heat extrudion is conducted at a die temperature of 210° C. and a screw rotation rate of 40 rpm.

The same strips as used in Example 1, having a length of 780 mm and width of 210 mm, are heated at about 250° C. by high frequency induction heating in both side end portions of a width of about 7 – 8 mm along the longitudinal direction, and adhesive film tapes of a 50$\mu$ thickness having a width of 5 mm are pressed on both side end portions of the strip for a period of 47 milliseconds by means of a press roll.

The so adhesive-applied strip is further cut into can blanks of 125 mm × 210 mm, and in the same manner as in Example 1, can bodies are prepared from these blanks. At the time of adhesion, both side end portions of blanks are heated at 250° C., and the press is conducted for 43 milliseconds under cooling.

Properties of adhesives prepared by the above-mentioned method, and results of the peel strength test of the resulting can bodies and the leakage test of the double-seamed cans are shown in Table II.

Table II

Relation Between Weight Ratio of Amide Recurring Units of Polymer of -amino undecanoic acid and Amide Recurring Units of Polycaprolactam in Copolyamide and Properties of Adhesive (weight ratio of crystalline homopolyamide/copolyamide = 75/25)

| Sample No. | Weight ratio of -amino undecanoic acid polymer amide recurring units/polycaprolactam amide recurring units | Heat of fusion | Peel strength (kg/cm) | Number of leakages from double-seamed portions per 240 samples | Water absorption (%) | Melting point (° C.) | Crystallization temperature (° C.) | Melt-viscosity at 230° C. (poise) | Melting point of copolyamide (° C.) | Water absorption of copolyamide (%) |
|---|---|---|---|---|---|---|---|---|---|---|
| 10 | 100/0 | 100 | 6.7 | 25 | 1.8 | 187 | 155 | 11600 | — | — |

Table II-continued
Relation Between Weight Ratio of Amide Recurring Units of
Polymer of -amino undecanoic acid and Amide Recurring
Units of Polycaprolactam in Copolyamide and Properties of
Adhesive (weight ratio of crystalline homopolyamide/copolyamide = 75/25)

| Sample No. | Weight ratio of -amino undecanoic acid polymer amide recurring units/polycaprolactam amide recurring units | Heat of fusion | Peel strength (kg/cm) | Number of leakages from double-seamed portions per 240 samples | Water absorption (%) | Melting point (° C.) | Crystallization temperature (° C.) | Melt-viscosity at 230° C. (poise) | Melting point of copolyamide (° C.) | Water absorption of copolyamide (%) |
|---|---|---|---|---|---|---|---|---|---|---|
| 11 | 97/3 | 99 | 7.1 | 8 | 1.8 | 187 | 155 | 11300 | 183 | 2.0 |
| 12* | 95/5 | 91 | 10.3 | 1 | 1.9 | 187 | 154 | 11000 | 180 | 2.3 |
| 13* | 90/10 | 88 | 12.2 | 0 | 1.9 | 187 | 154 | 10500 | 174 | 2.6 |
| 14* | 80/20 | 78 | 14.5 | 0 | 2.0 | 186 | 153 | 10600 | 159 | 3.4 |
| 15* | 70/30 | 74 | 13.0 | 0 | 2.0 | 186 | 153 | 10300 | 152 | 4.0 |
| 16* | 60/40 | 73 | 11.0 | 1 | 2.3 | 184 | 152 | 10800 | 150 | 4.6 |
| 17 | 50/50 | 70 | 6.5 | 13 | 2.7 | 182 | 150 | 9600 | 152 | 5.8 |
| 18 | 30/70 | 68 | 3.0 | 121 | 3.0 | 187 | 152 | 8200 | 167 | 7.4 |

From Table II, it is seen that when the mixing ratio by weight of the polymer of ω-amino undecanoic acid and the copolyamide is kept constant at 75 : 25, there appears a tendency that the decrease of the ratio of the weight of the amino recurring units of the polymer of ω-amino undecanoic acid to the weight of the recurring units of polycaprolactam in the copolyamide results in the decrease of the heat of fusion and that when the copolyamide comprises the recurring units of the polymer of ω-amino undecanoic acid in an amount of 95 – 60% by weight (samples 12 – 16), the resulting bonding has a high strength and occurrence of leakages in the double-seamed portion is greatly reduced. The bonding strength is highest when the copolyamide comprises the amide recurring units of the polymer of ω-amino undecanoic acid in an amount of 90 – 70% by weight (samples 13 – 15), and in these samples occurrence of leakages is not at all observed.

In case the amide recurring units of the polymer of ω-amino undecanoic acid occupy more than 95% by weight of the total recurring units, and in case the said amide recurring units occupy less than 60%, the bonding strength is lowered and occurrence of leakages is observed.

EXAMPLE 3

65 Parts by weight of granular solids of polyhexamethylene sebacamide (nylon 6 – 10; relative viscosity = 2.32), which is a crystalline polyamide, are mixed with 35 parts by weight of granular solids of a copolyamide (relative viscosity = 2.30 ± 0.05) consisting of the amide recurring units of polyhexamethylene sebacamide and the recurring units of polylauryl lactam at a weight ratio ranging from 100/0 to 30/70, and the blend is formed into a film of a thickness of 50μ by employing the same film-molding apparatus as used in Example 1.

The melt extrusion is conducted at a die temperature of 235° C. and a screw rotation rate of 40 rpm.

The same strips as used in Example 1, having a length of 780 mm and a width of 210 mm, are heated at about 260° C. by high frequency induction heating in both side end portions of a width of 7 – 8 mm along the longitudinal direction, and adhesive film tapes of a 50μ thickness having a width of 5 mm are pressed under cooling on both side end portions of the strip for a period of 53 milliseconds by means of a press roll.

The so adhesive-applied strip is further cut into blanks of 125 mm × 210 mm, and in the same manner as in Example 1, can bodies are prepared from these blanks.

At the time of adhesion, both side end portions of blanks are heated at 260° C. and the press is conducted for 50 milliseconds under cooling.

Properties of adhesives prepared by the above-mentioned method, and results of the peal strength test of the resulting can bodies and the leakage test of the double-seamed cans are shown in Table III.

Table III
Relation Between Weight Ratio of Polyhexamethylene Sebacamide Amide
Recurring Units and Polylauryl Lactame Amide Recurring Units in
Copolyamide and Properties of Adhesives
(weight ratio of crystalline homopolyamide/copolyamide = 65/35)

| Sample No. | Weight ratio of polyhexamethylene sebacamide amide recurring units/polylauryl lactam amide recurring units in copolyamide | Heat of fusion | Peel strength (Kg/cm) | Number of leakages from double-seamed portions per 240 samples | Water absorption (%) | Melting point (° C.) | Crystallization temperature (° C.) | Melt-viscosity at 240° C. (poise) | Melting point of copolyamide (° C.) | Water absorption of copolyamide (%) |
|---|---|---|---|---|---|---|---|---|---|---|
| 19 | 100/0 | 100 | 6.5 | 115 | 3.5 | 225 | 196 | 4600 | — | — |
| 20 | 97/3 | 93 | 7.0 | 37 | 3.4 | 225 | 196 | 4500 | 222 | 3.5 |
| 21* | 95/5 | 90 | 10.1 | 2 | 3.3 | 224 | 195 | 4600 | 220 | 3.4 |
| 22* | 90/10 | 84 | 12.6 | 0 | 3.3 | 223 | 194 | 4200 | 213 | 3.3 |
| 23* | 80/20 | 73 | 13.7 | 0 | 3.3 | 223 | 192 | 4200 | 198 | 3.1 |
| 24* | 70/30 | 70 | 12.5 | 0 | 3.2 | 222 | 191 | 3900 | 179 | 2.9 |
| 25* | 60/40 | 64 | 11.0 | 1 | 3.2 | 221 | 191 | 4300 | 162 | 2.7 |
| 26 | 50/50 | 65 | 5.2 | 21 | 3.1 | 219 | 187 | 4600 | 148 | 2.4 |

Table III-continued
Relation Between Weight Ratio of Polyhexamethylene Sebacamide Amide
Recurring Units and Polylauryl Lactame Amide Recurring Units in
Copolyamide and Properties of Adhesives
(weight ratio of crystalline homopolyamide/copolyamide = 65/35)

| Sample No. | Weight ratio of polyhexamethylene sebacamide amide recurring units/polylauryl lactam amide recurring units in copolyamide | Heat of fusion | Peel strength (Kg/cm) | Number of leakages from double-seamed portions per 240 samples | Water absorption (%) | Melting point (° C.) | Crystallization temperature (° C.) | Melt viscosity at 240° C. (poise) | Melting point of copolyamide (° C.) | Water absorption of copolyamide (%) |
|---|---|---|---|---|---|---|---|---|---|---|
| 27 | 30/70 | 61 | 2.0 | 215 | 3.1 | 219 | 188 | 4200 | 168 | 2.0 |

From Table III it is seen that the mixing weight ratio of polyhexamethylene sebacamide and the copolyamide is kept constant at 65 : 35, the decrease of the weight amount of the amide recurring units of polyhexamethylene sebacamide in the copolyamide results in the decrease of the heat of fusion and the bonding strength is high when the amide recurring units of polyhexamethylene sebacamide occupy 95 - 60% by weight of the total recurring units of the copolyamide (samples 21 - 25). Especially, in samples where the amide recurring units of polyhexamethylene sebacamide occupy 90 - 70% by weight of the total recurring units of the copolyamide component (samples 22 - 24), the bonding strength is highest and any leakage is not observed in the double-seamed portion.

The relation between the mixing ratio of the homopolyamide and copolyamide in the adhesive and properties of the resulting adhesive will now be illustrated by reference to Examples 4 and 5.

EXAMPLE 4

Granular solids of polylauryl lactam (having a relative viscosity of 2.28), which is a crystalline homopolyamide, are mixed with a copolyamide consisting of 82 parts by weight of the polylauryl lactam recurring units and 18 parts by weight of the polycaprolactam recurring units and having a relative viscosity $\eta r$ of 2.30, the mixing ratio by weight of the homopoly amide/copolyamide being changed in the range of from 100/0 to 30/70. The mixture is kneaded under heating by means of an extruder equipped with a nylon-type screw having a diameter of 40 mm and an effective length of 1120 mm at a die temperature of 200° - 220° C. and a screw rotation rate of 30 rpm.

Pellets of the so heat-kneaded adhesive is molded into a film of a thickness of 60μ by employing a film-forming apparatus comprising an extruder equipped with a nylon-type screw having a diameter of 25 mm and an effective length of 600 mm, and a T die having a width of 0.3 mm and a length of 100 mm, which is mounted on the extruder.

The extrusion is conducted at a die temperature of 200° C. and a screw rotation rate of 40 rpm.

A thin chromium-coated steel plate (0.22 mm thickness) having a 3μ coating of an epoxy-phenol paint is cut into strips of 780 mm × 170 mm. Both side end portions of the strip along the longitudinal direction thereof are heated at about 230° - 240° C. by high frequency induction heating, and tapes of a width of 5 mm of the above-mentioned film of a 60μ thickness are pressed on both side end portions of the strip for a period of 47 milliseconds by means of a press roll.

The so adhesive-applied strip is further cut into can blanks of 136 mm × 170 mm.

By employing a customary can-making apparatus, blanks are formed into cylindrical can bodies having a height of 136 mm by heating both adhesive-applied side end portions of blanks at 230° - 240° C. by high frequency induction heating and pressing them for 43 milliseconds under cooling so that the adhesive-applied faces confront each other. The width of the seamed overlap of the resulting can body is 5 mm.

Properties of the adhesive prepared by the above-mentioned method, and results of the peel strength test of can bodies and the leakage test of cans double-seamed with upper and lower lids are shown in Table IV.

Table IV
Relation Between Weight Ratio of Polylauryl Lactam and Copolyamide
Consisting of Lauryl Lactam and Caprolactam and Properties of
Adhesive (weight ratio of polylauryl lactam amide recurring units/
polycaprolactam amide recurring units in copolymer = 82/18)

| Sample No. | Weight ratio of polylauryl lactam/copolyamide | Heat of fusion | Peel strength (Kg/cm) | Number of leakages from double-seamed portions per 240 samples | Water absorption (%) | Melting point (° C.) | Crystallization temperature (° C.) | Melt viscosity at 220° C. (poise) | Melting point of copolyamide (° C.) | Water absorption of copolyamide (%) |
|---|---|---|---|---|---|---|---|---|---|---|
| 28 | 110/0 | 100 | 7.3 | 5 | 1.4 | 178 | 148 | 8500 | — | — |
| 29 | 97/3 | 97 | 7.9 | 6 | 1.4 | 178 | 148 | 8500 | 157 | 3.0 |
| 30* | 95/5 | 93 | 11.6 | 0 | 1.4 | 178 | 147 | 8600 | 157 | 3.0 |
| 31* | 89/11 | 88 | 16.0 | 0 | 1.5 | 177 | 145 | 8800 | 157 | 3.0 |
| 32* | 80/20 | 77 | 17.0 | 0 | 1.5 | 177 | 145 | 8800 | 157 | 3.0 |
| 33* | 70/30 | 64 | 16.5 | 0 | 1.6 | 175 | 143 | 8900 | 157 | 3.0 |
| 34* | 60/40 | 55 | 12.1 | 0 | 1.7 | 174 | 142 | 8900 | 157 | 3.0 |
| 35 | 50/50 | 39 | 6.2 | 32 | 2.1 | 169 | 137 | 9000 | 157 | 3.0 |

Table IV-continued
Relation Between Weight Ratio of Polylauryl Lactam and Copolyamide Consisting of Lauryl Lactam and Caprolactam and Properties of Adhesive (weight ratio of polylauryl lactam amide recurring units/polycaprolactam amide recurring units in copolymer = 82/18)

| Sample No. | Weight ratio of poly-lauryl lactam/copoly-amide | Heat of fusion | Peel strength (Kg/cm) | Number of leakages from double-seamed portions per 240 samples | Water absorption (%) | Melting point (° C.) | Crystallization temperature (° C.) | Melt viscosity at 220° C. (poise) | Melting point of copoly-amide (° C.) | Water absorption of copoly-amide (%) |
|---|---|---|---|---|---|---|---|---|---|---|
| 36 | 30/70 | — | X | X | 2.3 | 165 | 133 | 9600 | 157 | 3.0 |

Note: the mark "X" indicates that the preparation of can bodies by high speed adhesion is impossible.

By reference to test results shown in Table IV, it will now be explained that the adhesive of this invention is very excellent and that the limitation of the mixing ratio of the crystalline homopolyamide and copolyamide is of great significance.

As is seen from Table IV, when the mixing ratio of polylauryl lactam and the copolyamide is varied, as the weight ratio of polylauryl lactam to the copolyamide is lowered, the heat of fussion is reduced certainly, and the bonding strength is high with no leakage from double-seamed portions when the above weight ratio is within the range of from 95/5 to 60/40, namely the range specified in this invention (samples 30 – 34). Especially, in samples where the above weight ratio is within the range of from 89/11 to 70/30 (samples 31 – 33), the bonding strength is highest. In case the amount of polylauryl lactam in the adhesive exceeds 95% by weight, high heat of fusion is observed sometimes and the bonding strength by high speed adhesion is low with occurrence of leakages from the double-seamed portions. When the polylauryl lactam content in the adhesive is less than 60% by weight, although the heat of fusion low, since crystallization is not promoted during the cooling step conducted after the high speed adhesion step, with the result that the adhesion operation becomes difficult and the bonding strength is poor with occurrence of leakages. Especially in an adhesive in which the polylauryl lactam content is less than 30% by weight or an adhesive composed of the copolyamide alone, during the cooling step conducted after the adhesion step, crystallization is not at all promoted and it is impossible to conduct the high speed adhesion operation.

The water absorption of the adhesive is heightened as the polylauryl lactam content is lowered. However, within the range of the polylauryl lactam content specified in this invention, i.e., the range of from 95 to 60% by weight, the water absorption of the adhesive is hardly different from that of homopolylauryl lactam. Also the melting point, crystallization temperature and melt viscosity of the adhesive are hardly different from those of homopolylauryl lactam as far as the polylauryl lactam content is within the range specified in this invention.

EXAMPLE 5

Granules of ω-amino undecanoic acid polymer (nylon 11; relative viscosity = 2.45), which is a crystalline homopolyamide, are mixed with granules of a copolyamide (relative viscosity $\eta r$ = 2.35) consisting of 80 parts by weight of the ω-amino undecanoic acid polymer recurring units and 20 parts by weight of the polycaprolactam recurring units at the homopolyamide/copolyamide weight ratio ranging from 100/0 to 30/70, and they are kneaded under heating in the same manner as in Example 4. By employing the so prepared granular adhesive, a film having a thickness of 60μ is prepared in the same manner as in Example 4.

Both side end portions in the longitudinal direction of the same metal plate strip as used in Example 4 are heated at about 240° – 250° C. by high frequency induction heating and 5 mm wide tapes of the above adhesive film of a 60μ thickness are pressed on said side end portions of the strip for 47 milliseconds by means of a press roll. The so adhesive-applied strip is cut into can blanks of 136 mm × 170 mm.

By employing a customary can-making apparatus, the blanks are molded into cyclindrical forms, and both side end portions are heated at 240° – 250° C. by high frequency induction heating and pressed for 43 milliseconds under cooling so that the adhesive-applied faces confront each other. Thus there are prepared can bodies in which the seamed overlap width is 5 mm.

Properties of the adhesive prepared by the above method, and results of the peel strength test of the so prepared can bodies and the leakage test of double-seamed cans are shown in Table V.

Table V
Relation Between Weight Ratio of Poly-ω-Amino Undecanoic Acid and Copolyamide Consisting of ω-Amino Undecanoic Acid and Caprolactam and Properties of Adhesive (weight ratio of poly-ω-amino undecanoic acid amide recurring units/polycaprolactam amide recurring units in copolyamide = 80/20)

| Sample No. | Weight ratio of poly-ω-amino undecanoic acid/copolyamide | Heat of fusion | Peel strength (Kg/cm) | Number of leakages from double-seamed portions per 240 samples | Water absorption (%) | Melting point (° C.) | Crystallization temperature (° C.) | Melt viscosity at 230° C. (poise) | Melting point of copoly-amide (° C.) | Water absorption of copoly-amide (%) |
|---|---|---|---|---|---|---|---|---|---|---|
| 37 | 100/0 | 100 | 6.7 | 25 | 1.8 | 187 | 155 | 11600 | — | — |
| 38 | 97/3 | 99 | 7.4 | 19 | 1.8 | 187 | 155 | 11400 | 159 | 3.4 |
| 39* | 95/5 | 94 | 9.6 | 0 | 1.8 | 187 | 155 | 11300 | 159 | 3.4 |
| 40* | 89/11 | 89 | 12.7 | 0 | 1.9 | 186 | 153 | 11100 | 159 | 3.4 |
| 41* | 80/20 | 78 | 14.5 | 0 | 2.0 | 186 | 153 | 10600 | 159 | 3.4 |
| 42* | 70/30 | 66 | 13.0 | 0 | 2.1 | 185 | 151 | 10300 | 159 | 3.4 |

Table V-continued

Relation Between Weight Ratio of Poly-ω-Amino Undecanoic Acid and Copolyamide Consisting of ω-Amino Undecanoic Acid and Caprolactam and Properties of Adhesive (weight ratio of poly-ω-amino undecanoic acid amide recurring units/polycaprolactam amide recurring units in copolyamide = 80/20)

| Sample No. | Weight ratio of poly-ω-amino undecanoic acid/copolyamide | Heat of fusion | Peel strength (Kg/cm) | Number of leakages from double-seamed portions per 240 samples | Water absorption (%) | Melting point (° C.) | Crystallization temperature (° C.) | Melt viscosity at 230° C. (poise) | Melting point of copolyamide (° C.) | Water absorption of copolyamide (%) |
|---|---|---|---|---|---|---|---|---|---|---|
| 43* | 60/40 | 54 | 11.0 | 0 | 2.2 | 184 | 149 | 10000 | 159 | 3.4 |
| 44 | 50/50 | 41 | 5.4 | 89 | 2.5 | 179 | 149 | 9500 | 159 | 3.4 |
| 45 | 30/70 | — | X | X | 2.8 | 174 | 145 | 9100 | 159 | 3.4 |

Note: the mark "X" indicates that the preparation of can bodies by high speed adhesion is impossible.

As is seen from Table V, when the mixing ratio of the polymer of ω-amino undecanoic acid and the copolyamide is varied, the bonding strength is high in samples where the content of the polymer of ω-amine undecanoic acid is 95 – 60% by weight (samples 39 – 43). Especially in samples where the content of the polymer of ω-amino undecanoic acid is 89 – 70% by weight (samples 40 – 42), the bonding strength is highest.

Further, any leakage after the double-seaming operation is not observed at all in samples where the content of the polymer of ω-amino undecanoic acid is 95 – 60% by weight.

In an adhesive where the content of the polymer of ω-amino undecanoic acid is more than 95% or less than 60% by weight, the bonding strength is low and occurrence of leakages in double-seamed cans is extreme. As far as the content of the polymer of ω-amino undecanoic acid is within the range of this invention, the adhesive composition exhibits similar water absorption, melting point, crystallization temperature and melt viscosity to those of the homopolymer of ω-amino undecanoic acid.

EXAMPLE 6

This Example illustrates influences of the kinds of the crystalline homopolyamide component and the copolyamide component on properties of the adhesive.

The mixing of the homopolyamide and copolyamide components and the film formation are carried out by adopting procedures and devices described in Example 1.

At the steps of blending the homopolyamide and copolyamide components of the adhesive, and forming a film from the blend, the die temperature is maintained at a level higher by about 20° – 30° C. than the melting point of the crystalline homopolyamide.

The same metal plate as used in Example 1 is employed for the preparation of can bodies. Tapes of a 5 mm width of the adhesive film of a 50μ thickness are pressed on both end portions of a metal plate strip heated at a temperature higher by about 50° – 70° C. than the melting point of the adhesive. The pressing time is 47 milliseconds.

The so adhesive-applied strip is cut into blanks of 125 mm × 210 mm, and can bodies are prepared therefrom in the same manner as described in Example 1.

The metal blank temperature at the time of making can bodies by bonding with the adhesive is maintained at a level higher by 50° – 70° C. than the melting point of the adhesive, and the cold-pressing time is 43 milliseconds.

The resulting can bodies are double-seamed with lids in the same manner as in Example 1.

Properties of the adhesive, and results of the peel strength and leakage tests of the so prepared cans are shown in Table VI.

Table VI

Properties of Crystalline Homopolyamide/Copolyamide Mixed Adhesives

| Sample No. | Crystalline homopolyamide | Copolyamide Constituents | Weight ratio of copolyamide constituents | Homopolyamide/copolyamide weight ratio |
|---|---|---|---|---|
| 46* | polylauryl lactam | ω-amino dodecanoic acid/hexamethylene diammonium sebacate | 85/15 | 65/35 |
| 47* | polylauryl lactam | ω-amino undecanoic acid/ε-caprolactam | 85/15 | 65/35 |
| 48* | polylauryl lactam | ω-amino dodecanoic acid/ε-caprolactam/hexamethylene diammonium adipate | 60/20/20 | 80/20 |
| 49* | poly-ω-amino undecanoic acid | ω-amino dodecanoic acid/hexamethylene diammonium adipate | 80/20 | 70/30 |
| 50* | polyhexamethylene dodecamide | dodecamethylene diammonium adipate/ω-amino caprylic acid | 85/15 | 70/30 |
| 51* | polydodecamethylene dodecamide | dodecamethylene diammonium adipate/ε-caprolactam | 80/20 | 80/20 |
| 52 | polylauryl lactam | ε-caprolactam/hexamethylene diammonium adipate | 80/20 | 70/30 |
| 53 | polyhexamethylene adpamide | ε-caprolactum/hexamethylene diammonium adipate | 80/20 | 70/30 |
| 54 | ε-caprolactam | ε-caprolactam/hexamethylene diammonium adipate | 30/20 | 85/15 |
| 55 | — | ω-amino undecanoic acid/-caprolactam | 80/20 | 0/100 |
| 56 | polyhexamethyl- | hexamethylene diammonium | 55/45 | 30/70 |

Table VI-continued

Properties of Crystalline Homopolyamide/Copolyamide Mixed Adhesives

| | | | | | |
|---|---|---|---|---|---|
| 57 | lene sebacamide polyhexamethyl- lene sebacamide | sebacate/hexamethylene diammonium adipate hexamethylene diammonium sebacate/hexamethylene diammonium adipate/ε-caprolactam | 30/46/24 | | 30/70 |

| Sample No. | Heat of fusion | Peel strength (Kg/cm) | Number of leakages from double-seamed portions per 240 samples | Water absorption (%) | Melting point (° C.) | Crystallization temperature (° C.) | Melting point of copolyamide (° C.) | Water absorption of copolyamide (%) |
|---|---|---|---|---|---|---|---|---|
| 46* | 71 | 13.7 | 0 | 1.6 | 175 | 144 | 163 | 1.9 |
| 47* | 70 | 10.5 | 2 | 1.8 | 175 | 144 | 156 | 3.0 |
| 48* | 70 | 14.0 | 0 | 1.8 | 177 | 144 | 130 | 3.0 |
| 49* | 68 | 10.0 | 3 | 2.1 | 186 | 152 | 154 | 3.3 |
| 50* | 68 | 9.5 | 2 | 2.5 | 209 | 176 | — | — |
| 51* | 77 | 13.4 | 0 | — | 184 | 151 | — | — |
| 52 | 64 | 7.0 | 24(per 24 samples) | 2.4 | 178 | — | 188 | 9.3 |
| 53 | 68 | X | X | 9.0 | 254 | — | 188 | 9.3 |
| 54 | 78 | X | X | 9.5 | 215 | — | 188 | 9.3 |
| 55 | — | X | X | — | — | — | 159 | 3.4 |
| 56 | — | X | X | 5.8 | 218 | 190 | 200 | 7.5 |
| 57 | — | X | X | 5.0 | 203 | — | 180 | 6.8 |

Note: the mark "X" indicates that the preparation of can bodies by high speed adhesion is impossible.

From Table VI it is seen that adhesives obtained by incorporating in a crystalline homopolyamide (a) a variable copolyamide (b) within the scope of this invention can give a desirable combination of an excellent bonding strength by the high speed adhesion operation and an excellent processability of the bonded portion.

In samples where the amide recurring units of the homopolyamide component (i) of the copolyamide (b) to be incorporated into the crystalline homopolyamide (a) are the same as those of the crystalline homopolyamide (a), the peel strength by the high speed adhesion operation is high as compared with the case of samples where the recurring units of the component (i) of the copolyamide (b) differ from those of the crystalline homopolyamide (a), and when such samples are used, occurrence of leakages from the double-seamed portions is not at all observed.

In samples comprising as the component (a) a crystalline homopolyamide outside the scope of this invention, the preparation of can bodies by the high speed adhesion is impossible because of too high a melting point and too high a water absorption. Similarly, the preparation of can bodies by the high speed adhesion is impossible in the case of copolymer adhesives free of the crystalline homopolyamide component (a), because crystallization is not promoted during the cooling step.

EXAMPLE 7

This Example illustrates the relation between the relative viscosity of the crystalline homopolyamide of the adhesive of this invention and properties of the adhesive.

80 Parts by weight of granular solids of polylauryl lactam as the crystalline homopolyamide are mixed with 20 parts by weight of a copolyamide ($\eta r$ = 2.40) consisting of 80 parts by weight of the amide recurring units of polylauryl lactam and 20 parts by weight of the amide recurring units of polycaprolactam, and the granular mixture is formed into a film having a thickness of 50μ by employing the same film-forming apparatus as used in Example 1, while the heat extrusion is conducted at a die temperature of 200° – 240° C. and a screw rotation rate of 40 rpm.

The same strip as employed in Example 1, having a length of 780 mm and a width of 210 mm, is heated at about 240° C. by high frequency induction heating on both side end portions of a width of 7 – 8 mm along the longitudinal direction, and 5 mm wide tapes of the above adhesive film of a thickness of 50μ are pressed on both side end portions of the strip for 47 milliseconds by means of a press roll. The so adhesive-applied strip is cut into can blanks of 125 mm × 210 mm, and can bodies are prepared therefrom in the same manner as in Example 1. At this can-making step, the both side ends of the blank is heated at about 250° C. and the pressing operation is conducted for 43 milliseconds under cooling.

Data of the melt viscosity in adhesives prepared by the above-mentioned method and results of the peel strength test of the so prepared can bodies and the leakage test of doubleseamed cans are shown in Table VII.

Table VII

Relation Between Relative Viscosity of Crystalline Homopolyamide and Properties of Adhesive
(crystalline homopolyamide = polyalauryl lactam: copolyamide = one consisting of 80 parts by weight of polylauryl lactam amide recurring units and 20 parts by weight of the polycaprolactam recurring units)

| Relative Viscosity of Polylauryl Lactam | Melt Viscosity[1] at 230° C. (poise) | Peel Strength (Kg/cm) | Number of Leakages from Double-Seamed Portions per 240 Samples |
|---|---|---|---|
| 1.5 | 450 | 11.5 | 221 |
| 1.9 | 1600 | 14.5 | 3 |
| 2.3 | 4300 | 17.0 | 0 |
| 2.5 | 7800 | 16.5 | 0 |
| 3.2 | 40000 | 11.5 | 2 |

Table VII-continued
Relation Between Relative Viscosity of Crystalline Homopolyamide and Properties of Adhesive
(crystalline homopolyamide = polylauryl lactam: copolyamide = one consisting of 80 parts by weight of polylauryl lactam amide recurring units and 20 parts by weight of the polycaprolactam recurring units)

| Relative Viscosity of Polylauryl Lactam | Melt Viscosity[1] at 230° C. (poise) | Peel Strength (Kg/cm) | Number of Leakages from Double-Seamed Portions per 240 Samples |
|---|---|---|---|
| 3.7 | 100000 | 2.0 | 24 (per 24 samples) |

[1]: the melt viscosity is measured by employing a extrusion flow tester with a nozzle diameter of 0.5 mm and a nozzle length of 1 mm under a load of 30 Kg.

From Table VII it is seen that in samples in which polylauryl lactam as the crystalline homopolyamide component has a relative viscosity as low as 1.5 the bonding exhibits a peel strength to some extent but occurrence of leakages is extreme because of destruction of the bonded portion after the double-seaming operation, which is considered to be due to the fact that the adhesive per se is brittle and fragile. In samples where the relative viscosity of polylauryl lactam is as high as 3.7, the melt viscosity of the adhesive is too high and hence, the bonding strength by the high speed adhesion operation is not sufficient and the resulting can bodies fail to have properties required. From results of this Example it is seen that adhesives in which the relative viscosity of polylauryl lactam is within the range of from 1.9 to 3.2 exhibit sufficient properties required of adhesives to be used for the high speed adhesion operation.

EXAMPLE 8

This example illustrates that the adhesive of this invention is effective for bonding various metal materials.

As the adhesive is used the film of sample 32 formed in Example 4, and metal plates indicated in Table VIII are bonded. Ends of the metal plate to be bonded are heated at about 240° C. and 5 mm wide tapes of the adhesive film are pressed for 70 milliseconds.

In the state where the adhesive-applied faces confront each other, the metal plate is heated at about 240° C. and the pressing operation is conducted for 70 milliseconds under cooling. Results of the peel strength test are shown in Table VIII.

For comparison, the above procedures are repeated by employing as the adhesive polylauryl lactam having a relative viscosity of 2.28, which is a crystalline homopolyamide.

Table VIII
Bonding Strength Obtained by Bonding Various Metals with Adhesive of This Invention

| Metal Plate To Be Bonded | Peel Strength (Kg/cm) Adhesive of this invention | Adhesive composed of nylon 12 alone |
|---|---|---|
| Steel plate | 7.0 | 4.8 |
| Tin-coated steel plate | 5.9 | 3.2 |
| Tin-coated steel plate with phenol-epoxy enamel coating | 8.0 | 4.5 |
| Aluminum plate | 7.1 | 4.3 |
| Steel plate electrically treated with chromic acid | 10.8 | 5.0 |
| Steel plate electrically treated with chromic acid with phenol-epoxy enamel coating | 17.0 | 7.5 |
| Chromium-coated steel plate | 10.1 | 5.0 |
| Chromium-coated steel plate with phenol-epoxy enamel coating | 16.7 | 7.6 |

From Table VIII it is seen that the adhesive of this invention can give higher bonding strength to various metal plates than polylauryl lactam which is a crystalline homopolyamide.

EXAMPLE 9

The granular blend of the adhesive composition of sample 33 formed in Example 4 is used as the adhesive and it is melt-extruded in the ribbon-like form. Then, the extrudate is pressed at about 230° C. for 70 milliseconds on the surfaces of metal plates indicated in Table IX along the width of 15 mm.

The adhesive-applied surface of the metal plate is overlapped on the adhesive-free surface of the metal plate, and the metal plate is heated at about 260° C., following which the pressing operation is conducted for 100 milliseconds under cooling. Results of the peel strength test of the bonded portions are shown in Table IX.

For comparison, the above procedures are repeated by employing as the adhesive polylauryl lactam having a relative viscosity of 2.28, which is crystalline polyamide.

Table IX
Bonding Strength Obtained by Bonding Various Metals with Adhesive of This Invention

| Metal Plate To Be Bonded | Peel Strength (Kg/cm) Adhesive of this invention | Adhesive composed of nylon 12 alone |
|---|---|---|
| Steel plate | 6.8 | 4.5 |
| Tin-coated steel plate | 6.0 | 3.0 |
| Zinc-coated steel plate | 7.3 | 4.0 |
| Aluminum plate | 7.2 | 4.2 |
| Steel plate electrolytically treated with chromic acid | 10.5 | 5.3 |
| Thin chromium-coated steel plate | 10.2 | 5.1 |
| Steel plate electrolytically treated with | | |

Table IX-continued
Bonding Strength Obtained by Bonding Various Metals with Adhesive of This Invention

| Metal Plate To Be Bonded | Peel Strength (Kg/cm) | |
|---|---|---|
| | Adhesive of this invention | Adhesive composed of nylon 12 alone |
| chromic acid with epoxy enamel coating | 16.5 | 7.8 |
| Thin chromium-coated steel plate with epoxy enamel coating | 16.3 | 7.3 |

From Table IX it is seen that the adhesive of this invention can give higher bonding strength to various metal plates than polylauryl lactam which is a crystalline homopolyamide

What we claim is:

1. A metal-bonding adhesive composition consisting essentially of 89 – 60% by weight, based on the total composition, of an aliphatic homopolyamide and 11 – 40% by weight, based on the total composition, of an aliphatic copolyamide, said homopolyamide being a crystalline homopolyamide having 7 – 13 amide groups per 100 carbon atoms in the polymer backbone, said copolyamide consisting of 90 – 70% by weight of (i) recurring units such that a homopolyamide thereof has 7 – 13 amide groups per 100 carbon atoms in the polymer backbone and (ii) 10 – 30% by weight of (ii) recurring units which are different from the recurring units (i), and said copolyamide being the same as the recurring units of said crystalline homopolyamide.

2. A metal-bonding adhesive composition set forth in claim 1, wherein said crystalline homopolyamide is composed of recurring units selected from recurring units expressed by the formula $$+CORNH+$$

wherein R stands for a linear alkylene radical having at least 7 carbon atoms,
and recurring units expressed by the formula $$+COR^1CONH-R^2-NH+$$

wherein $R^1$ and $R^2$ each stand for a linear alkylene radical and the total number of the carbon atoms of $R^1$ and $R^2$ is at least 14.

3. A metal-bonding adhesive composition set forth in claim 1, wherein said crystalline homopolyamide has a relative viscosity of from 1.8 to 3.5 measured with respect to a solution of 1 g of the polymer in 100 cc of 98% sulfuric acid at 20° C.

4. A metal-bonding adhesive composition set forth in claim 1, wherein said copolyamide consists of 90 – 70% by weight of the recurring units (i) expressed by the formula $$+CO-R-NH+$$

wherein R stands for a linear alkylene radical having at least 7 carbon atoms,
and 10 – 30% by weight of the recurring units (ii) selected from recurring units expressed by the formula $$+CO-R^3-NH+$$

wherein $R^3$ is a linear alkylene radical having at least 5 carbon atoms, which is different from R of the recurring units (i),
and recurring units expressed by the formula $$+CO-R^4-CONH-R^5-NH+$$

wherein $R^4$ is a linear alkylene radical having at least 4 carbon atoms and $R^5$ is a linear alkylene radical having at least 6 carbon atoms.

5. A metal-bonding adhesive composition set forth in claim 1, wherein said copolyamide consists of 90 – 70% by weight of the recurring units (i) expressed by the formula $$+CO-R^1-CONH-R^2-NH+$$

wherein $R^1$ is a linear alkylene radical having at least 4 carbon $R^2$ is a linear alkylene group having at least 6 carbon atoms, and the total number of the carbon atoms of $R^1$ and $R^2$ is at least 14,
and 10 – 30% by weight of the recurring units (ii) selected from recurring units expressed by the formula $$+CO-R^6-CONH-R^7-NH+$$

wherein $R^6$ is a linear alkylene radical having at least 4 carbon atoms, $R^7$ is a linear alkylene radical having at least 6 carbon atoms, and at least one of $R^6$ and $R^7$ differs from $R^1$ and $R^2$ of the recurring units (i),
and recurring units expressed by the formula $$+CO-R^8-NH+$$

wherein $R^8$ is a linear alkylene radical having at least 5 carbon atoms.

6. A metal-bonding adhesive composition set forth in claim 1, wherein said copolyamide has a relative viscosity of from 1.8 to 3.5 measured with respect to a solution of 1 g of the polymer in 100 cc of 98% sulfuric acid at 20° C.

7. A metal-bonding adhesive composition set forth in claim 1, wherein either said crystalline homopolyamide or said polyamide component (i) is composed of recurring units expressed by the formula $$+CO-R-NH+$$

wherein R stands for a linear alkylene radical having at least 7 carbon atoms.

8. A metal-bonding adhesive composition set forth in claim 1, wherein either said crystalline homopolyamide or said polyamide component (i) is composed of recurring units expressed by the formula $$+CO-R^1-CONH-R^2-NH+$$

wherein $R^1$ is a linear alkylene radical at least 4 carbon atoms, $R^2$ is a linear alkylene groups having at least 6 carbon atoms, and the total number of the carbon atoms of $R^1$ and $R^2$ is at least 14.

9. A metal-bonding adhesive composition set forth in claim 1, wherein said crystalline homopolyamide (a) and said copolyamide (b) are present at a weight ratio of the following range (a) : (b) = 89 – 70 : 11 – 30

10. A metal-bonding adhesive composition set forth in claim 1, which is molded into the form of a tape.

11. A process for the preparation of a metal-bonding adhesive composition, which comprises mixing in the molten state 89 – 60% by weight, based on the total composition, of an aliphatic homopolyamide and 11 – 40% by weight, based on the total composition of an aliphatic copolyamide, said homopolyamide being a crystalline homopolyamide having 7 – 13 amide groups per 100 carbon atoms in the polymer backbone, said copolyamide groups consisting of 90 – 70% by weight of (i) recurring units such that a homopolyamide thereof has 7 – 13 amide groups per 100 carbon atoms in the polymer backbone and (ii) 10 – 30% by weight of (ii) recurring units which are different from the recurring units (i), and said recurring units (i) of said copolyamide being the same as the recurring units of said crystalline homopolyamide; and molding the resulting mixture in the form of a tape.

12. A polyamide composition consisting essentially of 89 – 60% by weight, based on the total composition, of polylauryl-lactam and 11 – 40% by weight, based on the total composition, of an aliphatic copolyamide, said copolyamide consisting of 90 – 70% by weight of (i) recurring units of lauryl lactam and 10 – 30% by weight of (ii) recurring units other than those of lauryl lactam.

13. A polyamide composition according to claim 12 wherein the recurring units (ii) are those of at least one member selected from the group consisting of ω-aminocaproic acid, hexamethylene ammonium adipate, hexamethylene ammonium sebacate and hexamethylene ammonium dodecanoate.

14. A polyamide composition according to claim 12 which takes a form of a tape.

15. A polyamide composition according to claim 12 which takes a form of a powder.

16. A polyamide powder composition comprising,
  A. 60 – 89 percent by weight, based on the total composition, of an aliphatic homopolyamide and
  B. about 40 – 11 percent by weight, based on the weight of the total composition, of an aliphatic copolyamide, said homopolyamide having 7 – 13 amide groups per hundred carbon atoms in the polymer backbone, said copolyamide consisting of 70 – 90% by weight of
    (i) recurring units having 7 – 13 amide groups per 100 carbon atoms in the polymer backbone, wherein said recurring units are the same as the recurring units of said homopolyamide and 30 – 10% by weight of (ii) recurring units which are different from the recurring units in (i).

* * * * *